US009618984B2

(12) United States Patent
Butterbaugh et al.

(10) Patent No.: US 9,618,984 B2
(45) Date of Patent: Apr. 11, 2017

(54) SLEEVE ELECTROMAGNETIC SHIELD

(71) Applicant: INTERNATIONAL BUSINESS MACHINES CORPORATION, Armonk, NY (US)

(72) Inventors: Matthew A. Butterbaugh, Rochester, MN (US); Eric A. Eckberg, Rochester, MN (US); Camillo Sassano, Durham, NC (US); Kevin L. Schultz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 14/611,394

(22) Filed: Feb. 2, 2015

(65) Prior Publication Data
US 2016/0224074 A1 Aug. 4, 2016

(51) Int. Cl.
*H05K 9/00* (2006.01)
*G06F 1/18* (2006.01)

(52) U.S. Cl.
CPC .................... *G06F 1/182* (2013.01)

(58) Field of Classification Search
USPC ............... 361/799, 816, 818, 752, 796, 800; 385/53, 58, 59, 76
See application file for complete search history.

(56) References Cited

U.S. PATENT DOCUMENTS

| | | | |
|---|---|---|---|
| 3,168,612 A * | 2/1965 | Sorenson | H02B 1/048 174/57 |
| 4,941,850 A | 7/1990 | Ankers et al. | |
| 5,520,554 A | 5/1996 | Henningsson | |
| 5,823,803 A | 10/1998 | Majors | |
| 6,066,001 A * | 5/2000 | Liptak | H01R 13/65802 439/108 |
| 6,370,037 B1 * | 4/2002 | Schoenfish | H05K 5/0204 174/542 |
| 6,610,922 B1 * | 8/2003 | Twiss | H05K 9/0041 174/390 |
| 6,822,879 B2 * | 11/2004 | Rathnam | G02B 6/4277 361/800 |
| 7,097,490 B2 | 8/2006 | Eaton et al. | |

(Continued)

FOREIGN PATENT DOCUMENTS

EP 001382953 A2 1/2004

OTHER PUBLICATIONS

"Junctions, Connectors, Accessories", 2012 ABB.
"Epic Connectors", Lapp Group ECB Sep. 2010.

*Primary Examiner* — Hung S Bui
(74) *Attorney, Agent, or Firm* — Matthew C. Zehrer

(57) ABSTRACT

An electromagnetic (EMC) shielding system includes a bezel and a sleeve. The bezel includes an exterior opening aligned with an accessible computer enclosure component. The sleeve includes a shoulder portion in contact with the exterior of the bezel, a flange portion protruding into the interior of the bezel through the exterior opening, and a tunnel portion extending through the shoulder portion and flange portion. The accessible computer enclosure component generally is positioned within the tunnel portion. An EMC shielding method includes inserting the sleeve into an exterior opening of the computer enclosure bezel and installing the bezel to a computer enclosure such that the accessible component is positioned within the tunnel portion.

15 Claims, 5 Drawing Sheets

(56) References Cited

U.S. PATENT DOCUMENTS

| | | | |
|---|---|---|---|
| 7,322,854 B2* | 1/2008 | Long | H01R 13/65802 |
| | | | 439/607.28 |
| 7,484,896 B2 | 2/2009 | DeCusatis et al. | |
| 7,722,402 B2* | 5/2010 | Pepe | H01R 13/518 |
| | | | 439/607.18 |
| 7,843,704 B2* | 11/2010 | Chang | H05K 7/1461 |
| | | | 361/741 |
| 8,282,401 B2 | 10/2012 | Hensen et al. | |
| 8,506,324 B2* | 8/2013 | Naufel | H01R 12/7082 |
| | | | 439/541.5 |
| 8,733,857 B2* | 5/2014 | Wu | G06F 1/187 |
| | | | 312/223.2 |
| 8,801,466 B2 | 8/2014 | Wimmer et al. | |
| 2002/0157844 A1* | 10/2002 | Laflamme | H02G 3/123 |
| | | | 174/50 |
| 2003/0021552 A1 | 1/2003 | Mitchell | |
| 2006/0278420 A1* | 12/2006 | Chen | G06F 1/181 |
| | | | 174/50 |
| 2010/0068935 A1* | 3/2010 | Chou | H01R 27/02 |
| | | | 439/620.22 |

* cited by examiner

SLEEVE ELECTROMAGNETIC SHIELD

FIELD OF THE INVENTION

Embodiments of the invention generally relate to computer systems and more particularly to the electromagnetic shielding of a computer enclosure.

DESCRIPTION OF THE RELATED ART

Electromagnetic (EMC) shielding is the practice of reducing the electromagnetic field in a space by blocking the field with barriers made of conductive or magnetic materials. Shielding is typically applied to enclosures to isolate electrical devices from the 'outside world', and to cables to isolate wires from the environment through which the cable runs. Electromagnetic shielding that blocks radio frequency electromagnetic radiation is also known as RF shielding.

The shielding can reduce the coupling of radio waves, electromagnetic fields and electrostatic fields. A conductive enclosure used to block electrostatic fields is also known as a Faraday cage. The amount of reduction depends very much upon the material used, its thickness, the size of the shielded volume and the frequency of the fields of interest and the size, shape and orientation of apertures in a shield to an incident electromagnetic field.

Current computer enclosures include state of the art components such as processors, memory modules, etc. that generate heat, the removal of which may require flowing air through the computer enclosure. To remove the most amount of heat, the restriction of the airflow out of the enclosure should be minimized. At the same time, high-frequency radiation generated within the enclosure also should be contained.

A bezel is typically the user facing panel of the enclosure and may include air flow perforations to promote air flow. The bezel may also include openings so that the user may access computer components such as connectors, drives, etc. Such openings are generally much larger compared to the size of the airflow perforations. Currently, it is difficult to shield against EMC fields emanating from these larger openings. Current solutions include the use of conductive fabric-over-foam gaskets or spring fingers that electrically contact the component and the enclosure.

In addition, many current bezels are manufactured from sheet metal and utilize expensive fabrication tools (e.g. punch tooling, etc.) to remove material to create the air flow perforations and other openings.

SUMMARY

In an embodiment of the present invention, an electromagnetic (EMC) shielding system includes a computer enclosure bezel and sleeve. The bezel includes an exterior opening aligned with an accessible computer enclosure component. The sleeve includes a shoulder portion in contact with the exterior of the bezel, a flange portion protruding into the interior of the bezel through the exterior opening, and a tunnel portion extending through the shoulder portion and flange portion. The accessible computer enclosure component is generally positioned within the tunnel portion.

In another embodiment of the present invention, an electromagnetic EMC shielding method includes inserting the sleeve into an exterior opening of the computer enclosure bezel and installing the bezel to the computer enclosure such that the accessible component of the computer enclosure is positioned within the tunnel portion.

In yet another embodiment of the present invention, an EMC shielding method includes inserting the sleeve into an exterior opening of a computer enclosure bezel, installing the bezel to the computer enclosure such that the accessible component of the computer enclosure is positioned within the tunnel portion, and attaching a retainer to the sleeve from the interior side of the bezel.

These and other embodiments, features, aspects, and advantages will become better understood with reference to the following description, appended claims, and accompanying drawings.

DETAILED DESCRIPTION

Embodiments of the invention generally relate to computer systems and more particularly to the electromagnetic shielding of a computer enclosure. An electromagnetic (EMC) shielding system includes a bezel and a sleeve. The bezel includes an exterior opening aligned with an accessible computer enclosure component. The sleeve includes a shoulder portion in contact with the exterior of the bezel, a flange portion protruding into the interior of the bezel through the exterior opening, and a tunnel portion extending through the shoulder portion and flange portion. The accessible computer enclosure component generally is positioned within the tunnel portion. An EMC shielding method includes inserting the sleeve into an exterior opening of the computer enclosure bezel and installing the bezel to a computer enclosure such that the accessible component is positioned within the tunnel portion.

Figure 1:
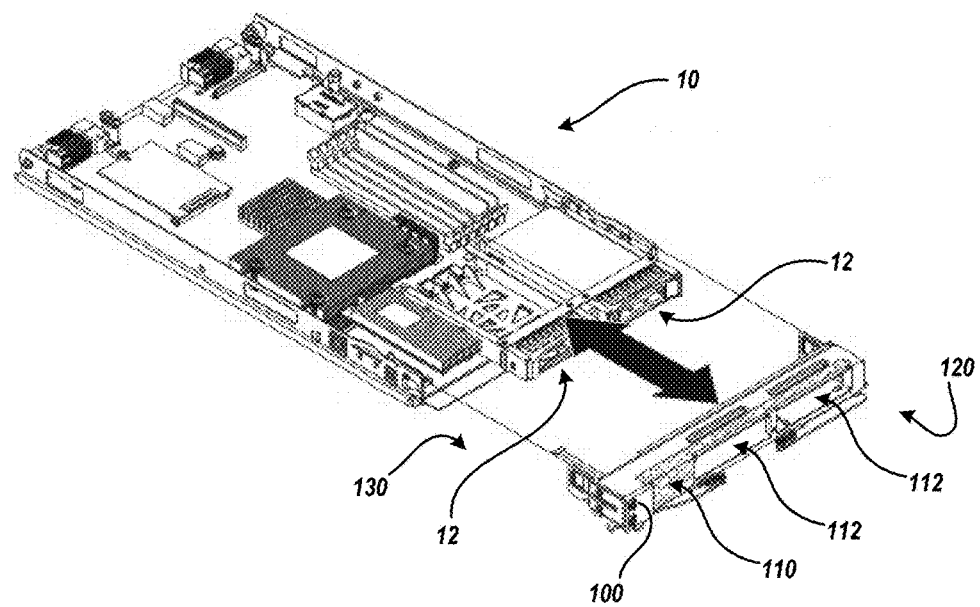
FIG. 1 illustrates a computer enclosure that may implement one or more embodiments of the present invention.

Referring to the FIGs., wherein like numbers denote like parts throughout the several views, FIG. 1 depicts a high-level block diagram representation of a computer enclosure 10 and bezel 100. The term "computer" is used herein for convenience only, and in various embodiments is a more general data handling system, such as a mobile phone, tablet, server computer, storage system, etc. The mechanisms and apparatus of embodiments of the present invention apply equally to any appropriate data handling systems where EMC fields are to be shielded.

The major components of the computer enclosure 10 such as or more processors, memory, storage drives (magnetic, flash, etc.), adapter cards, etc. may produce heat during normal operation. Heat may be removed from enclosure 10 via fans or other active fluid heat removal systems. In embodiments, air flows through the computer enclosure. In other embodiments, the computer enclosure 10 may be cooled by contained flowing cooled liquid. The enclosure 10 includes one or more user accessible components 12 that are accessible to the user via bezel 100 openings 112. Components 12 may be, for example, a connector, drive, memory module, adapter card, etc.

Bezel 100 is a user facing panel of enclosure 10 and includes at least openings 112 to allow access to components 12. The bezel 100 may also include one or more perforation portions 110 to allow air flow to enter or exit enclosure 10. In those embodiments, where enclosure 10 is liquid cooled, bezel 100 typically does not include the one or more perforation portions 110. The system as is described herein generally includes an exterior side 120 that faces the user and interior side 130 that faces the interior of enclosure 10.

Figure 2:
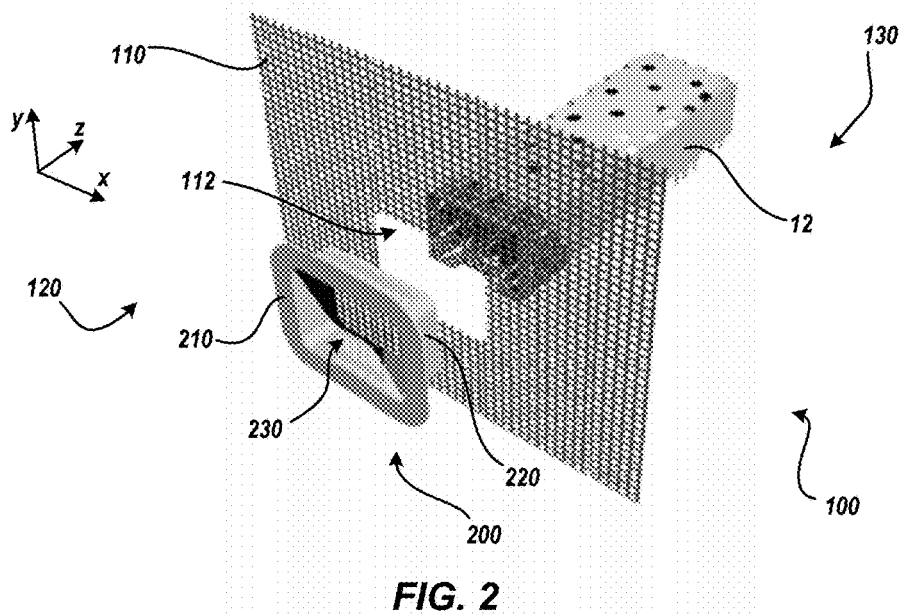
FIG. 2-FIG. 5 illustrates exemplary sleeved EMC shielding embodiments.
Figure 3:
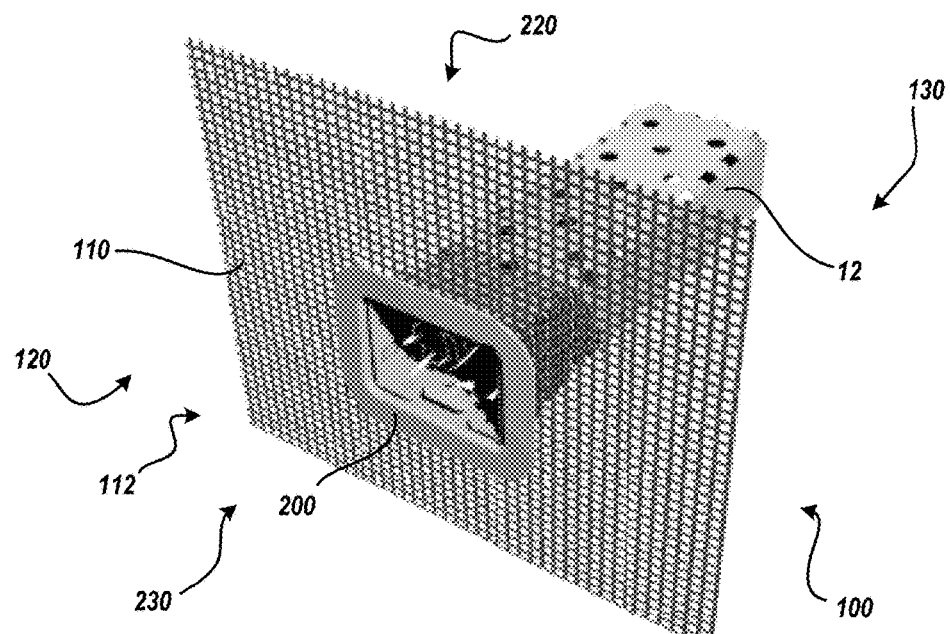

FIG. 2 illustrates an exemplary sleeved EMC shielding embodiment including a component 12, bezel 100, opening 112, and EMC shielding sleeve 200. In the presently illustrated embodiment, bezel 100 is shown including a weaved wire portion 110. Shielding sleeve 200 includes a shoulder portion 210, a flange portion 220, and tunnel portion 230. Generally, sleeve 200 is made from an electrically conductive material (metal, conductive plastic, etc.) and fits within opening 112 of bezel 100. Bezel 100 is also made from an electrically conductive material. Shoulder portion 210 is generally a portion of abrupt change in shape or diameter relative to flange portion 220 designed to retain shielding sleeve 200 in the z-direction against exterior side 120 of bezel 100. Flange portion 220 extends from the interior side 130 of shoulder portion 210 and is generally orthogonal to shoulder portion 210.

An outer size or diameter of flange portion 220 is generally smaller than the outer size or diameter of shoulder portion 210. Further, the outer size or diameter of flange portion 220 is similar to the size or diameter of opening 112. For example, the dimensions of flange portion 220 may be slightly larger that the dimensions to opening 112 to allow for an interference fit of the sleeve 200 within opening 112. An interference fit, also known as a press fit or friction fit, is a fastening between two parts which is achieved by friction after the parts are pushed together. In other examples, the dimensions of flange portion 220 may be slightly smaller than the dimensions of opening 112 to allow for flange portion 220 to fit within opening 112. In these implementations the sleeve 200 may be connected to bezel 100 by fastening materials such as (glue, solder, welding material, brazing material, etc.). Such exemplary attachment schemes to bezel 100 may generally limit movement of sleeve 200 in the negative z-direction as illustrated. When sleeve 200 is inserted into opening 112, the shoulder portion 210 is orientated on the exterior side 120 of bezel 100 and flange portion 220 protrudes beyond the interior side 130 of bezel 100. Generally, the size or outer diameter of flange portion 220 is such to limit movement of sleeve 200 in the x-direction and y-direction as illustrated by generally fitting within opening 112. Tunnel portion 230 is an opening extending through the shoulder portion 220 and flange portion 210 and allows for access to component 12. In certain embodiments, surfaces within the tunnel portion may be tapered to allow the proper alignment of component 12 within tunnel portion 230 during the installation of the bezel 100 onto enclosure 10. For example, the interior dimensions of tunnel portion 230 at the interior side 130 of sleeve 200 may be larger than the interior dimensions of tunnel portion 230 at the exterior side 120 of sleeve 200.

FIG. 2 illustrates an exemplary sleeved EMC shielding embodiment where bezel 100 is installed to enclosure 10. Upon the bezel 100 being installed to enclosure 10, the flange portion 220 lays within the interior of enclosure 10. As seen in FIG. 2, the opening 112, tunnel portion 230, and component 12 are orientated so that the component 12 fits within tunnel portion 230 when bezel 100 is installed to enclosure 10. The dimensions of tunnel portion 230 are generally similar to the outer dimensions of component 12. For example, the dimensions of tunnel portion 230 may be slightly smaller than the outer dimensions of component 12 to allow for an interference fit between component 12 and tunnel portion 230. In other examples, the dimensions of tunnel portion 230 may be slightly larger than the outer dimensions of component 12 (e.g. 0.2 mm-10 mm, etc.). Contact may be made between component 12 and tunnel portion 230 by e.g., spring fingers, embosses, etc.

Figure 4:
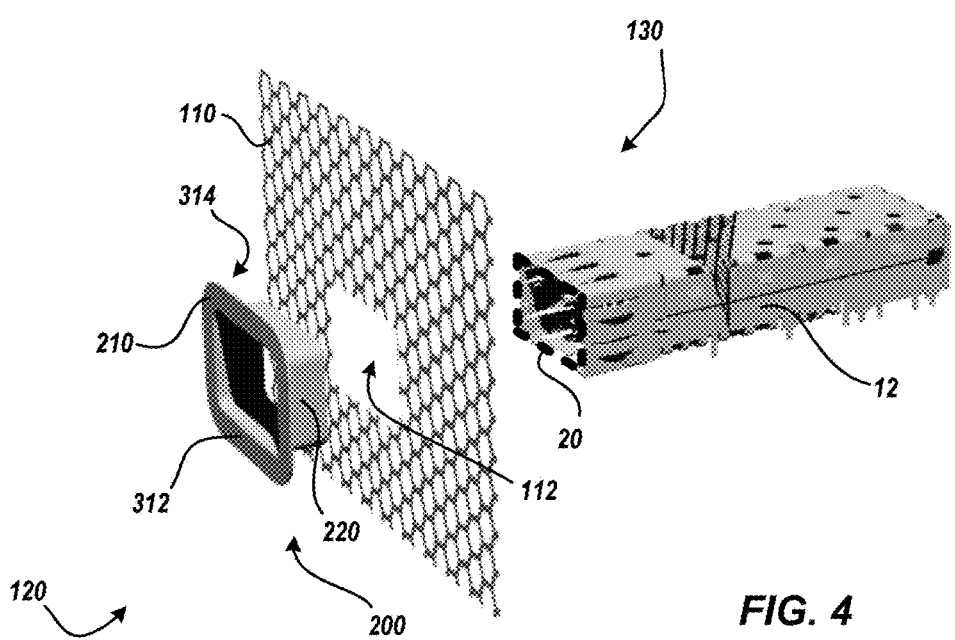

FIG. 4 illustrates an exemplary sleeved EMC shielding embodiment including a component 12, bezel 100, opening 112, and EMC shielding sleeve 200. In the presently illustrated embodiment, bezel 100 is shown including punched perforated portion 110. In further embodiments, shoulder portion 210 may include a front surface 312 and back surface 314. In embodiments, when sleeve 200 is inserted into opening 112, front surface 312 may be coplanar with exterior side 120 of bezel 100. In other words, bezel 100 may include a recess to allow for the coplanarity of front surface 312 and exterior side 120. In other embodiments, back surface 314 may be coplanar with exterior side 120 of bezel 100. Also presently illustrated, component 12 may include an exterior plane 20 that is the exterior most portion of component 12. In embodiments, when bezel 100 is installed to enclosure 10, exterior plane 20 may be coplanar with front surface 312. In other embodiments, when bezel 100 is installed to enclosure 10, exterior plane 20 may be interior to front surface 312. In other words, when bezel 100 is installed, exterior plane 20 may lay within tunnel portion 230.

Figure 5:
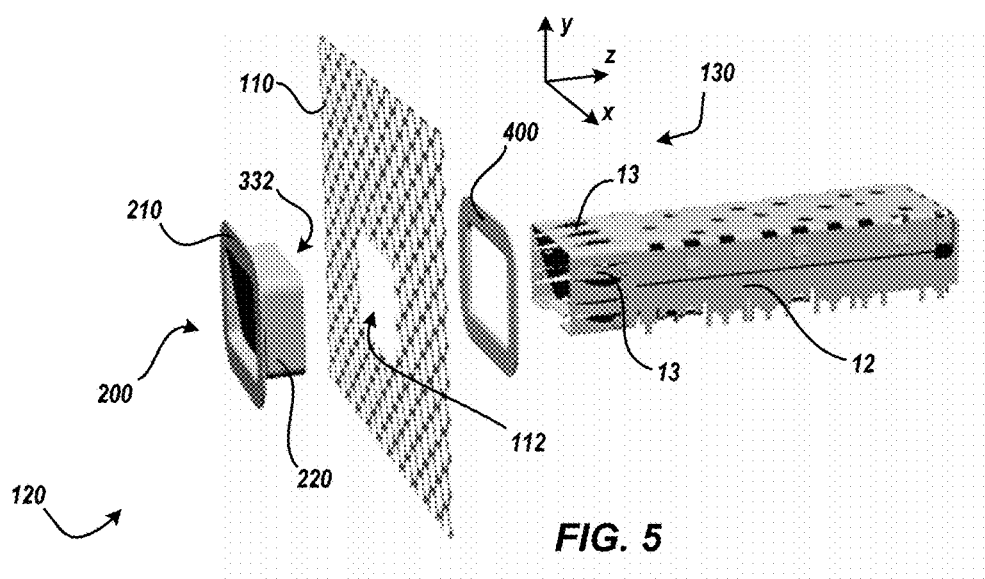

FIG. 5 illustrates an exemplary sleeved EMC shielding embodiment including a component 12, bezel 100, opening 112, EMC shielding sleeve 200, and sleeve retainer 400. Retainer 400 is made from an electrically conductive material and attaches to sleeve 200 and retains sleeve 200 upon bezel 100. The retainer 400 may attach to sleeve 200 from the interior side 130 of bezel 100. For example, the retainer 400 may attach, clip, snap, press fit, or otherwise fasten to flange portion 200. Once attached, the retainer 400 prevents sleeve 200 from movement in the negative z-direction as illustrated. Retainer 400 may include a central opening that accepts flange portion 220 interior thereto. Sleeve 200 may include a protrusion surface 332, also referred to as interior surface that is the most interior surface of sleeve 200 when bezel 100 is installed to enclosure 10. Protrusion surface 332 is separated from front surface 312 by dimension n. When the bezel 100 is installed to enclosure 10, the exterior plane 20 of component extends within tunnel portion 230 past protrusion surface 332. For clarity, a bezel may include a single opening 112 and corresponding sleeve 200 or multiple openings 112 and corresponding sleeves 200. In such embodiments the geometry of each sleeve 200 generally mirrors the geometry of its corresponding opening 112. For example, if a particular opening 112 is circular, the shape of flange portion 220 is circular, etc. Further, the dimensions of sleeve 200 may be adjusted to fit within opening 112 and to make electrical and mechanical contact with both bezel 100 (e.g. via contacting the perimeter of opening 112) and component 12 accessible therefrom.

Figure 6:
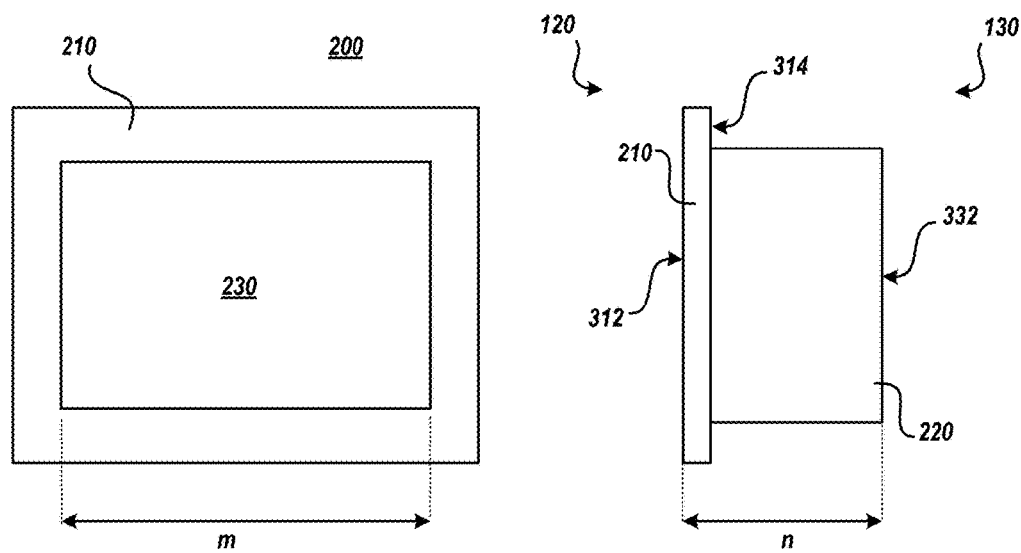
FIG. 6 illustrates front and side views of an EMC shielding sleeve, according to embodiments of the present invention.
Figure 7A:
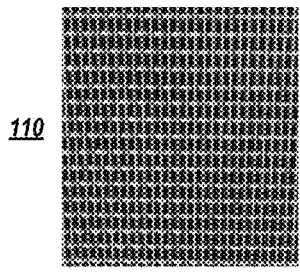
FIG. 7A-FIG. 7F illustrate exemplary computer enclosure bezel perforated portions, according to embodiments of the present invention.
Figure 7B:
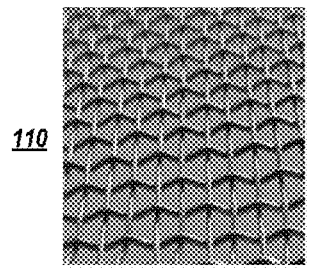
Figure 7C:
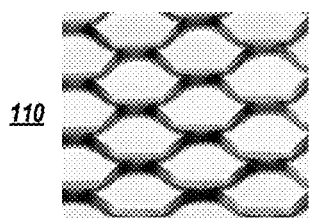
Figure 7D:
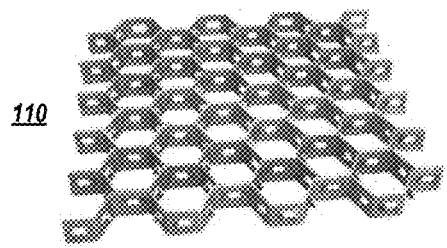
Figure 7E:
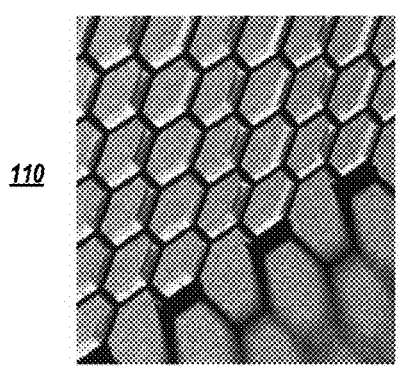
Figure 7F:
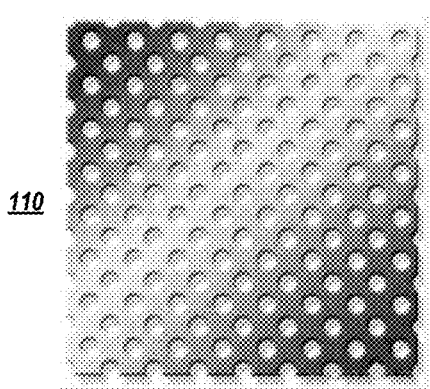

FIG. 6 illustrates front and side views of an EMC shielding sleeve, according to embodiments of the present invention. In embodiments, tunnel portion 230 has a maximum dimension m and depth dimension n. In embodiments, dimension n is greater than half of dimension m. In other embodiments, dimension n is equal to dimension m. In embodiments where component 12 does not contact surfaces within tunnel portion 230, the dimension n is increased to effectively shield desired EMC wavelengths. In embodiments, as shown in FIG. 6 where component 12 contacts (contact features 13 such as spring fingers, embosses, etc.) one or more surfaces within tunnel portion 230, the dimension n may be significantly less than the dimension m. For example, dimension n may be 5% of the dimension m.

FIG. 7A-FIG. 7F illustrate exemplary computer enclosure bezel perforated portions 110, according to embodiments of the present invention. As shown in FIG. 7A-FIG. 7F perforated portions 110 may be achieved by various types of permeable materials. Such permeable materials may come pre-perforated where air flow perforations need not be created during bezel 100 fabrication thus reducing the cost of manufacture.

Such embodiments may be beneficial when utilizing pre-treated or pre-painted perforated sheet metal, where electrical continuity between contact features 13 and the bezel could be compromised by paint or other non-conductive finish (including anodized aluminum). When punching a hole in painted sheet metal, the inside edge of would be bare metal, not covered by paint or finish. When the sleeve 200 is pressed inside opening 112, the tapered outside surface would be forced against the bare metal of the edge of the opening 112, thus in contact with metal, not paint.

Figure 8:
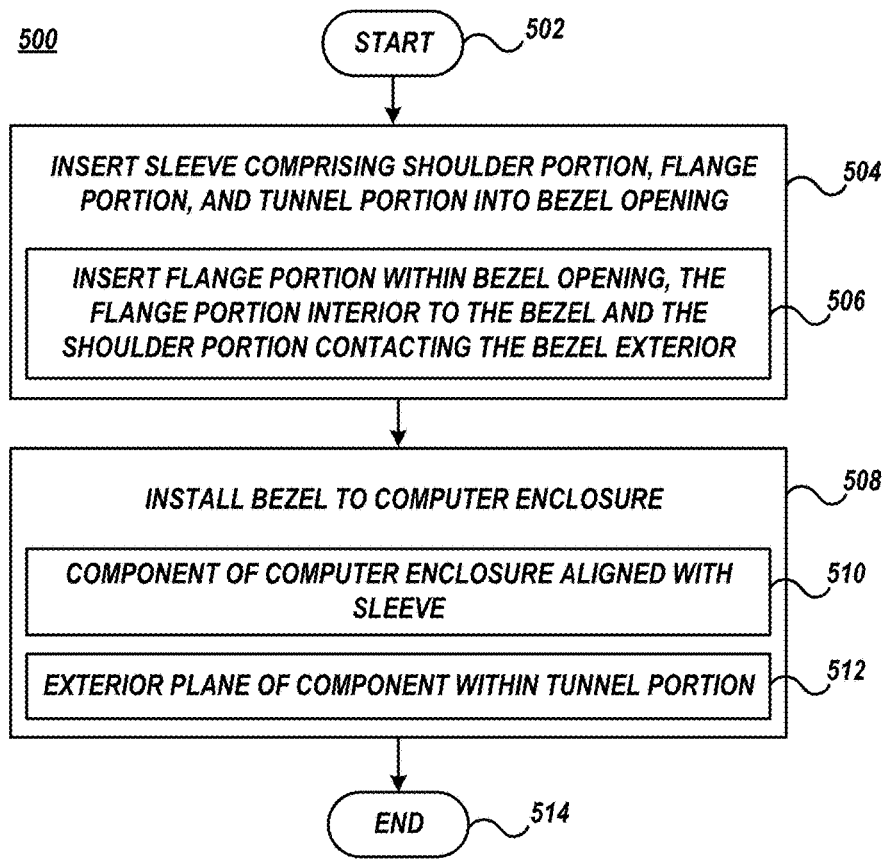
FIG. 8 illustrates an exemplary process for installing a computer enclosure with a bezel that includes an EMC shielding sleeve, according to various embodiments of the present invention.

FIG. 8 illustrates an exemplary process 500 for installing computer enclosure 10 with bezel 100 that includes an EMC shielding sleeve 200, according to various embodiments of the present invention. Process 500 may be utilized, for example, by a manufacturer, reseller, servicer, or other such assembler of enclosure 10. Process 500 begins at block 502 and continues with inserting shielding sleeve 200 into opening 112 of bezel 100 (block 504). For example, sleeve 200 is press fit etc. within opening 112 from exterior side 120 such that flange portion 220 contacts the perimeter of opening 112. In another example, sleeve 200 is press fit etc. within opening 112 from exterior side 120 and is attached to bezel 200 from interior side 130 (e.g., welded, soldered, glued, etc.). In other words, sleeve 200 mechanically and eclectically contacts bezel 100 via opening 112. In a particular embodiment, flange portion 220 is inserted within opening 112 thereby extending to the interior of bezel 100 until the shoulder portion 210 contacts exterior side 120 of bezel 100 (block 506). In another embodiment, retainer 400 is attached to sleeve 200 from interior side 130 of bezel 100. For example, the retainer 400 attaches (snaps, clips, fastened, etc.) to the flange portion 220 extending to the interior side 130 of bezel 100.

Process 500 may continue with installing bezel 100 to enclosure 10 (block 508). For example, the bezel is aligned with enclosure 10 and fastened (e.g., riveted, screwed, etc.) or otherwise attached to enclosure 10. In a particular embodiment, component 12 of enclosure 12 is aligned with sleeve 200 (block 510). For example, component 12 is aligned with tunnel portion 230. In another embodiment, the bezel 100 is installed to enclosure such the exterior plane 20 of component 12 is within tunnel portion 230 of sleeve 200 (block 512). For example, exterior plane 20 of component 12 may lay between front surface 312 and protrusion surface 332.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. An electromagnetic (EMC) shielding system comprising:
   a computer enclosure comprising a perforated bezel and an accessible computer enclosure component, the perforated bezel comprising a non-conductive finish upon a perforated metallic frame and an exterior opening comprising one or more exposed metallic frame surfaces; and
   an conductive EMC sleeve comprising a shoulder portion in contact with the exterior of the perforated bezel, a flange portion in contact with the one or more exposed metallic frame surfaces, the flange portion protruding into the interior of the perforated bezel through the exterior opening, and a tunnel portion extending through the shoulder portion and flange portion, wherein the accessible computer enclosure component comprises an exterior plane that is the most exterior portion of the accessible computer enclosure component, and wherein the exterior plane is between an exterior surface of the EMC sleeve that is the most exterior portion of the EMC sleeve and an interior surface of the EMC sleeve that is the most interior portion of the EMC sleeve.

2. The EMC shielding system of claim 1, wherein the EMC sleeve is press-fit into the exterior opening from an exterior side of the perforated bezel.

3. The EMC shielding system of claim 1, wherein the EMC sleeve is retained to the perforated bezel from an interior side of the perforated bezel.

4. The EMC shielding system of claim 3 further comprising:
   a retainer attached to the EMC sleeve from the interior side of the perforated bezel.

5. The EMC shielding system of claim 1, wherein the accessible computer enclosure component is a connector.

6. The EMC shielding system of claim 1, wherein the exterior plane is interior from an exterior surface of the EMC sleeve.

7. The EMC shielding system of claim 1, wherein the accessible computer enclosure component contacts one or more tunnel portion surfaces.

8. An electromagnetic (EMC) shielding method comprising:
   inserting a conductive EMC sleeve comprising a shoulder portion, a flange portion, and a tunnel portion into an exterior opening of a computer enclosure perforated bezel comprising a non-conductive finish upon a perforated metallic frame, wherein thereafter the shoulder portion is in contact with the computer enclosure perforated bezel exterior and the flange portion is in contact with one or more exposed metallic frame surfaces of the exterior opening; and
   installing the perforated bezel to the computer enclosure such that an accessible component of the computer enclosure is within the tunnel portion, the accessible component comprising exterior plane which is the most exterior portion of the accessible computer enclosure component, and wherein thereafter, the exterior plane is between an exterior surface of the EMC sleeve that is the most exterior portion of the EMC sleeve and an interior surface of the EMC sleeve that is the most interior portion of the EMC sleeve.

9. The EMC shielding method of claim 8, wherein the tunnel portion extends through the shoulder portion and flange portion.

10. The EMC shielding method of claim 8, wherein inserting a EMC sleeve comprising a shoulder portion further comprises:
    press-fitting the EMC sleeve into the exterior opening from an exterior side of the perforated bezel.

11. The EMC shielding method of claim 8, further comprising:
    retaining the EMC sleeve to the perforated bezel from an interior side of the perforated bezel.

12. The EMC shielding method of claim 8, wherein the computer enclosure component is a connector.

13. The EMC shielding method of claim 8, wherein the exterior plane is interior from an exterior surface of the EMC sleeve.

14. An electromagnetic (EMC) shielding method comprising:
    inserting a conductive EMC sleeve comprising a shoulder portion, a flange portion, and a tunnel portion into an exterior opening of a computer enclosure perforated bezel comprising a non-conductive finish upon a perforated metallic frame, wherein thereafter the shoulder portion is in contact with the computer enclosure perforated bezel exterior and the flange portion is in contact with one or more exposed metallic frame surfaces of the exterior opening;
    installing the perforated bezel to the computer enclosure such that an accessible component of the computer enclosure is within the tunnel portion, the accessible component comprising exterior plane which is the most exterior portion of the accessible computer enclosure component, and wherein thereafter, the exterior plane is between an exterior surface of the EMC sleeve that is the most exterior portion of the EMC sleeve and an interior surface of the EMC sleeve that is the most interior portion of the EMC sleeve; and
    attaching a retainer to the EMC sleeve from the interior side of the perforated bezel to retain the EMC sleeve to the perforated bezel.

15. The EMC shielding method of claim 14, wherein the tunnel portion extends through the shoulder portion and flange portion.

* * * * *